United States Patent [19]
Suzuki et al.

[11] Patent Number: 5,906,764
[45] Date of Patent: May 25, 1999

[54] METHOD OF AND APPARATUS FOR BAKING DOUGH

[75] Inventors: Minoru Suzuki; Satoshi Yamaguchi, both of Kanagawa-ken, Japan

[73] Assignee: Oshikiri Co., Ltd., Tokyo, Japan

[21] Appl. No.: 08/902,717

[22] Filed: Jul. 30, 1997

[30]      Foreign Application Priority Data

May 31, 1997 [JP] Japan ................................ 9-158092

[51] Int. Cl.$^6$ ........................................... H05B 6/78
[52] U.S. Cl. ........................ 219/700; 219/725; 219/752
[58] Field of Search ........................ 219/725, 752, 219/753, 754, 755, 756, 762, 684, 698, 700; 426/95, 94, 656, 241, 243, 523, 549, 512

[56]           References Cited

U.S. PATENT DOCUMENTS

| | | | |
|---|---|---|---|
| 3,424,590 | 1/1969 | Booras . | |
| 3,795,183 | 3/1974 | Roth et al. . | |
| 4,170,659 | 10/1979 | Totino et al. | 426/95 |
| 4,285,979 | 8/1981 | Izzi | 426/94 |
| 4,321,023 | 3/1982 | Rexroth . | |
| 4,910,040 | 3/1990 | Sagarino et al. | 426/656 |
| 4,911,939 | 3/1990 | Lou et al. | 426/241 |
| 5,175,010 | 12/1992 | Roig et al. | 426/19 |
| 5,523,106 | 6/1996 | Gimmler et al. | 426/549 |
| 5,589,210 | 12/1996 | De La Luz Martinez et al. | 426/243 |
| 5,714,178 | 2/1998 | Keener | 425/333 |

FOREIGN PATENT DOCUMENTS

| | | |
|---|---|---|
| 0 353 036 A1 | 1/1990 | European Pat. Off. . |
| 899 031 | 10/1953 | Germany . |
| 38 16 027 A1 | 11/1989 | Germany . |

OTHER PUBLICATIONS

English–language Patent Abstracts of Japan for Publication No. 09154521 of Jun. 17, 1997, Inventor Satoshi Yamaguchi, entitled "Production of Bread Crumb".

*Primary Examiner*—Tu B. Hoang
*Attorney, Agent, or Firm*—Flynn, Thiel, Boutell & Tanis, P.C.

[57] ABSTRACT

An apparatus and method for baking dough capable of easily adjusting the texture of dough without changing the mixture of ingredients of the dough. The apparatus includes a microwave irradiation part provided with a downstream belt conveyor and an upstream belt conveyor which is disposed immediately before the downstream belt conveyor and moves slower than the downstream belt conveyor. When the apparatus is incorporated into a crumb production line or bread production line, crumbs and bread having different dough textures can be easily baked.

9 Claims, 5 Drawing Sheets

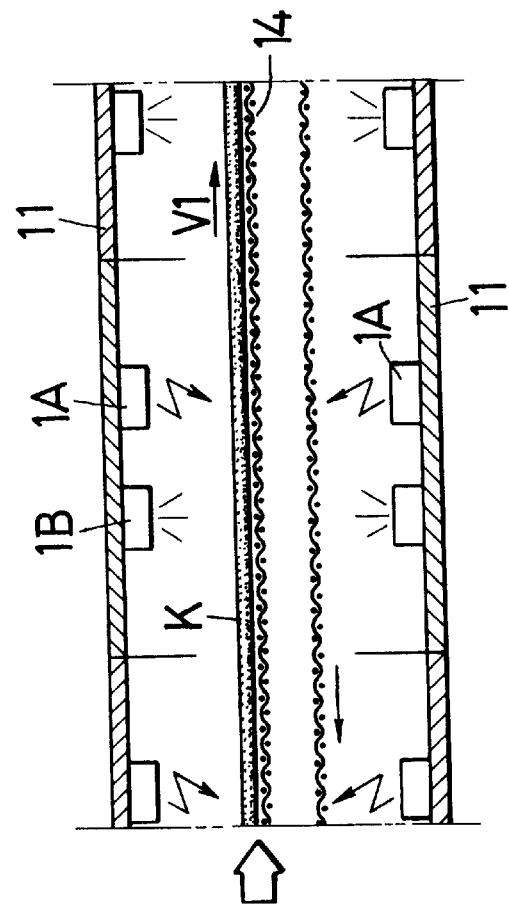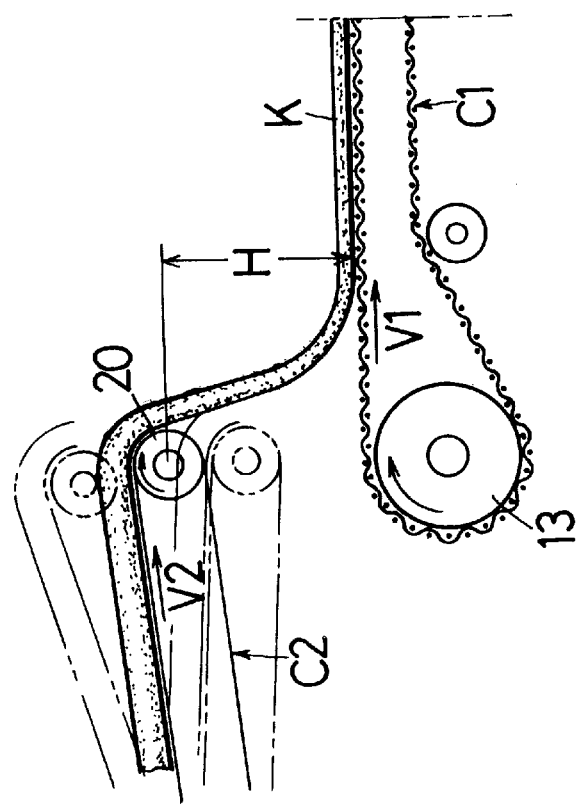

METHOD OF AND APPARATUS FOR BAKING DOUGH

BACKGROUND OF THE INVENTION

1. Field of the Invention

The present invention relates to a method and apparatus for baking dough, more particularly to those capable of adjusting the texture of dough.

2. Description of related art

The consumption of bread in Japan has recently increased without distinction of age or sex, and demand for bread has also increased.

Meanwhile, there has been a large demand for diversification of products in the field of foodstuffs, and the quality of bread has improved.

Particularly, dough is considered as a first point or first step of the baking process, and the quality thereof in terms of fragrance, color, resistance to the teeth, palate, etc. delicately influences mouth feeling or sensations experienced during eating.

Meanwhile, mouth feeling largely depends on the texture of dough which is a microscopic structure of dough. This is caused by the fact that the resistance to the teeth when eating bread depends on the structure of the texture of dough. It is a knowledge in the field of art that the texture of dough is slightly varied owing to the difference of mixture of ingredients. The difference of mixture of ingredients includes the difference of ratio of ingredients and the difference of raw materials or ingredients per se (hereinafter referred to simply as mixture of ingredients). It is possible to adjust the texture of dough positively utilizing the difference of mixture of ingredients.

However, there is a limit to vary the texture of dough depending on the mixture of ingredients, which causes changes in taste, and hence this is not necessarily an appropriate method.

Accordingly, it is very useful that if the texture of dough can be intentionally adjusted on the production line for baking bread without resorting to the mixture of ingredients of dough, but it has not been developed so far. The present invention has been created under such a background.

SUMMARY OF THE INVENTION

It is an object of the present invention to solve the aforementioned problems and to provide a method and apparatus for baking dough capable of easily adjusting the texture of dough without changing the mixture of ingredients.

To achieve the above object, the inventors studied these problems, and have found that if the texture of dough having particles oriented in a specific direction when it is stretched immediately before it is baked by a microwave, then it is subject to heating process by the microwave, the thus prepared texture of dough can be quickly fixed as a whole. Based on this finding, the present invention has been completed.

That is, a first aspect of the invention resides in a method of baking dough comprising adjusting texture of dough immediately before dough is baked while it is irradiated with a microwave to bake the dough.

A second aspect of the invention resides in the method wherein the texture of dough is adjusted by a pair of upstream and downstream belt conveyers which are moved at different speeds, wherein the dough is placed on the pair of belt conveyors and stretched while no load is applied thereto (hereinafter defined as under a non-pressure state).

A third aspect of the invention resides in the method wherein the texture of dough is adjusted by a pair of belt conveyers which are differentiated in height thereof and moved at different speeds, wherein the dough is placed on the pair of belt conveyors and stretched under a non-pressure state.

A fourth aspect of the invention resides in the method wherein the dough is irradiated with the microwave which ranges from 300 to 3000 MHz in frequency.

A fifth aspect of the invention resides in a method of baking dough including steps of adjusting texture of dough by a pair of upstream and downstream belt conveyers which are moved at different speeds, wherein the downstream belt is positioned under the upstream conveyor and the dough is placed on the pair of belt conveyors and stretched under a non-pressure state, and fixing the adjusted texture of dough by subjecting the dough to irradiation with the microwave ranging from 300 to 3000 MHz in frequency.

A sixth aspect of the invention resides in an apparatus for baking dough including a microwave irradiation part provided with a downstream belt conveyor and an upstream belt conveyor which is disposed immediately before the downstream belt conveyor and moves slower than the downstream belt conveyor.

A seventh aspect of the invention resides in the apparatus according to the sixth aspect of the invention wherein the upstream belt conveyor is disposed in a position which is higher than the downstream belt conveyor which moves through the microwave irradiation part.

An eighth aspect of the invention resides in the apparatus according to the sixth aspect of the invention wherein the upstream conveyor can be adjusted in height.

A ninth aspect of the invention resides in the apparatus according to the sixth aspect of the invention, wherein the upstream conveyor has a downstream roller which can be adjusted in height.

A tenth aspect of the invention resides in the apparatus for baking dough including a microwave irradiation part provided with a downstream belt conveyor, and an upstream belt conveyor which is disposed higher than and immediately before the downstream belt conveyor and moves slower than the downstream belt conveyor, wherein the upstream conveyor has a downstream roller which can be adjusted in height.

With the arrangements of the present invention as set forth above, the texture of dough can be adjusted before it is baked and the adjusted texture of dough can be securely fixed when it is baked.

If the dough is stretched under a non-pressure state while it is placed and moved on two belt conveyors C1 and C2 at the speed of V1/V2, a reticular structure of an infinite number of gluten which is present in the dough and bubbles of gas caused by fermentation are respectively stretched to be changed to long bubbles and the gluten texture of dough having particles oriented in a specific direction, namely, changed to a state where the texture of dough is stretched.

In case that the dough is stretched under a non-pressure state and non-contact state (by a difference described immediately later) by a pair of belt conveyors C1 and C2 which are spaced by a given vertical stage (by the difference therebetween in height), undue internal stress which was already present in the dough is reduced and the dough is efficiently stretched in the stretching direction, thereby uniformly forming a long texture of dough.

BRIEF DESCRIPTION OF THE DRAWINGS

FIGS. 2(A) and 2(B) are views showing a method of baking dough by a microwave according to a second embodiment of the present invention;

PREFERRED EMBODIMENTS OF THE INVENTION

Figure 1B:
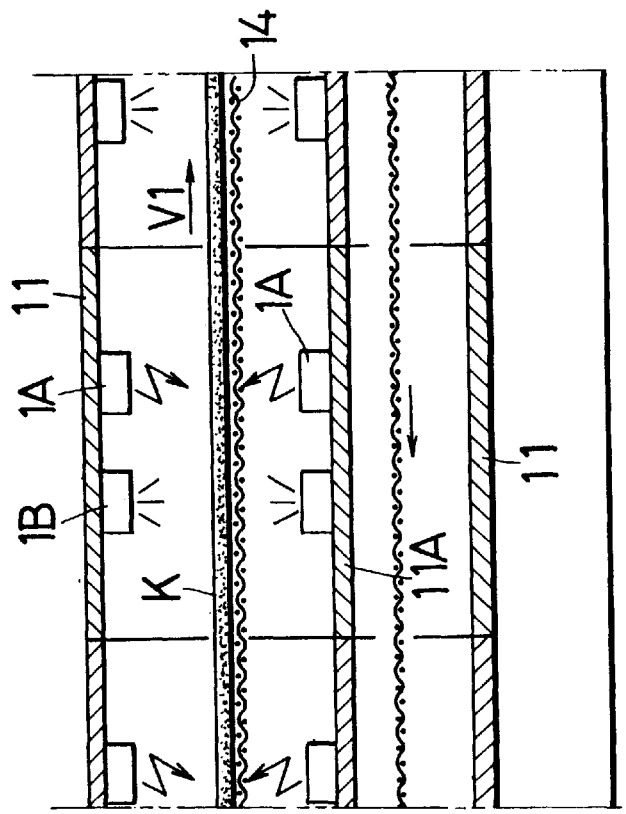
FIGS. 1(A) and 1(B) are views showing a method of baking dough by a microwave according to a first embodiment of the present invention.
Figure 1A:
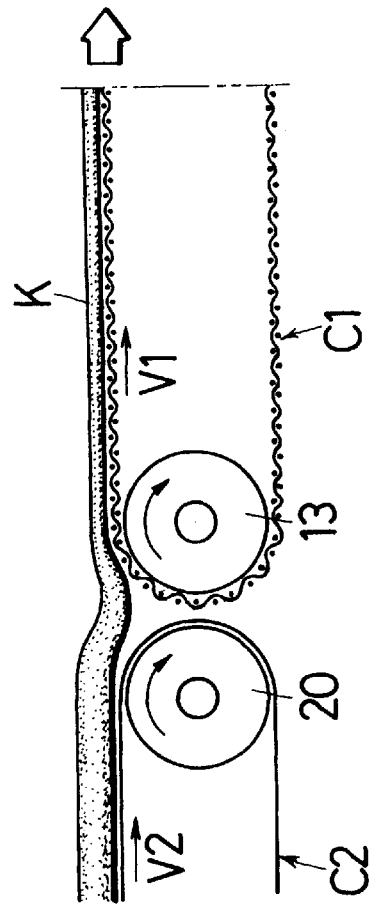

FIGS. 1(A) and 1(B) are views each showing a method of baking dough according to the present invention.

In this method of baking dough, the adjustment of dough can be performed in a state before, and more specifically immediately before, the texture of dough is baked.

The dough to be adjusted according to the invention is one which was subjected to rolling and stretching process, and ripening process, described later.

The adjustment of texture of dough is performed by stretching the dough which is placed under a non-pressure state on two belt conveyors, i.e. downstream and upstream belt conveyors C1 and C2 which different speed (see FIG. 1 (A)).

The upstream belt conveyor C2 includes an upstream roller and a downstream roller 20, and the downstream belt conveyor C1 includes an upstream roller 13 and a downstream roller, wherein only the downstream roller 20 and upstream roller 13 are shown in FIG. 1 (A).

During the adjustment of the texture of dough, a moving speed V2 of the upstream belt conveyor C2 is slower than a moving speed V1 of the downstream belt conveyor C1, namely, it is expressed as V1>V2. Since the dough is stretched under a non-pressure state between the belt conveyors C1 and C2 at the ratio of speeds expressed by V1/V2, from a microscopic point of view, the reticular structure of an infinite number of gluten which is present in the dough and bubbles of gas caused by fermentation are respectively stretched into long bubbles and the gluten texture of dough having particles oriented in a specific direction, and hence the texture of dough is changed to a stretched state.

In terms of appearance, the dough is changed to a state where, for example, the width of the dough is reduced (e.g., 80%) and the thickness of the dough is also reduced (e.g., 60%).

During the adjustment of the texture of dough, the speed V2 of the upstream belt conveyor C2 and the speed V1 of the downstream belt conveyor C1 are respectively changed to freely change a supply speed or a degree of stretching (stretching ratio) of the texture of dough.

When the stretching ratio is changed, the size of the texture of dough can be adjusted to a desired length, thereby freely forming the dough internal structure of which is differentiated. In this case, the ratio of speeds expressed by V1/V2 is set in the range from 1.1 to 4.2 and preferably set in the range from 1.2 to 2.8.

After the dough is formed in a given manner, the dough is subject to the baking while it is irradiated with a microwave (see FIG. 1 (B)).

What is important is that the dough is quickly baked while it is irradiated with the microwave after the formation of the texture of dough. The reason is that the dough ferments us time elapses after the adjustment of texture of dough, and the adjusted texture of dough gradually relaxen collapses, and hence the texture of dough having particles oriented in a specific direction will be deprived from the dough.

Unless the texture of dough is baked immediately so as to be fixed, it is useless that the texture of dough is collapsed or the texture of dough having particles oriented in a specific direction is deprived from the dough in the process of baking even if the texture is adjusted to be enlarged.

The dough is irradiated with the microwave and baked in a state where a dough having a shape like a sheet (hereinafter referred to as a dough K), which is moved together with the downstream belt conveyor C1, is irradiated with the microwave.

More in detail, a plurality of microwave irradiation sources 1A are provided on upper and lower parts of an outer covering body 11 wherein the dough is irradiated with the microwave when the dough K is placed on a reticular endless belt 14 and is moved between the microwave irradiation sources 1A.

The microwave used in the present invention ranges from 300 MHz to 3000 MHz in frequency in view of efficiently fixing the texture of dough. Hot air is blown from a hot air blowing port 1B to dry and remove moisture omitted from the dough when it is heated by an auxiliary external heat source or baked.

What is also important here is that the dough must be irradiated with a microwave when it is baked.

The reason is that the baking using the microwave can quickly heat the dough as a whole including the inside of the dough, which is different from an ordinarily used oven which does not use microwave but use gas, electricity and hot air, etc., and hence the dough can be fixed immediately before the texture of dough is relaxed and collapsed.

Accordingly, the texture of dough which can be previously formed by the adjustment thereof can be accurately and efficiently baked and fixed in a state as it is.

In another method of baking the dough using the ordinarily oven without using a microwave, the heating of the inside of the dough is delayed, and hence uniform heating as a whole cannot be expected.

The baking by the microwave is different from the baking by the ordinarily used oven, and hence there are effects that the surface or crust of dough is hardly colored, and white crumbs can be produced even if the crust of the dough is mixed in the pulverizing process.

FIGS. 2 (A) and 2 (B) show a method of baking a dough according to a second embodiment of the invention.

In the first embodiment set forth in FIG. 1, the upstream belt conveyor C2 is disposed on the same level as the downstream belt conveyor C1, but in the second embodiment, the upstream belt conveyor C2 is not disposed on the same level as the downstream belt conveyor C1, namely, the former is disposed with a given stage (difference of height) relative to the latter (see FIG. 2 (A)).

The upstream belt conveyor C2 is positioned higher than the downstream belt conveyor C1 with a stage H. The upstream belt conveyor C2 is designed to be adjusted in height. More specifically, when the downstream roller 20 is vertically moved, the height of the upstream belt conveyor C2 is varied, and hence the difference of the stage of the upstream belt conveyor C2 relative to the downstream belt conveyor C1 can be adjusted.

In the adjustment of the texture of dough according to the second embodiment, a speed V2 of the upstream belt conveyor C2 is slower than a speed V1 of the downstream belt conveyor C1 which is expressed as V1>V2.

The adjustment of the texture of dough is performed when the dough is stretched due to the difference in speeds of the downstream belt conveyor C1 and upstream belt conveyor C2. In the second embodiment, the dough is stretched under a non-pressure and non-contact state (by the difference of the stage H) between a pair of downstream belt conveyor C1 and upstream belt conveyor C2 which are positioned with the stage H, and hence undue internal stress which has been already present in the dough is reduced and the dough is efficiently stretched in the stretching direction, thereby uniformly forming a long texture of dough.

Since the adjustment of height of the upstream belt conveyor C2 relative to that of the downstream belt conveyor C1 can be performed, the length of the dough can be adjusted under non-pressure and non-contact state, and the formation of the optimum texture of dough can be assured depending on a quantity of dough.

Thereafter the dough is baked as it is quickly irradiated with the microwave, thereby fixing the texture of dough. The baking in the second embodiment can be performed in the same manner as the first embodiment shown in FIG. 1 (see FIG. 2 (B)).

Although the method of baking dough has been explained hereinbefore, an apparatus for baking dough will be next described. An apparatus for carrying out the method of baking dough according to the second embodiment as illustrated in FIGS. 2 (A) and 2 (B) is first described.

Figure 3:
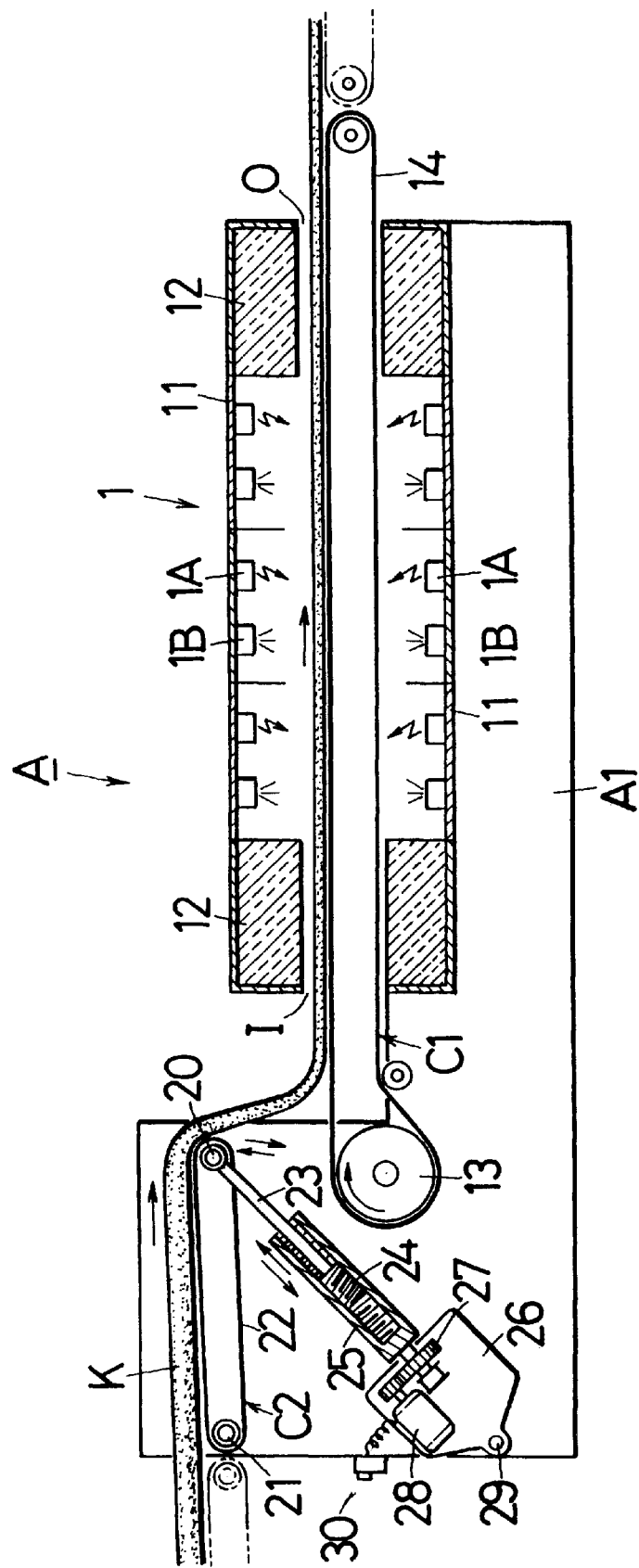
FIG. 3 is a view of a microwave baking apparatus.

FIG. 3 shows an apparatus for baking dough (hereinafter referred to as dough baking apparatus A). The dough baking apparatus A comprises a microwave irradiation part 1 and the upstream belt conveyor C2 which is disposed immediately before as upstream of the microwave irradiation part 1. The microwave irradiation part 1 employs a known microwave irradiation apparatus and primarily includes an outer covering body 11, microwave irradiation sources 1A which are disposed inside the outer covering body 11 at the upper and lower parts thereof, and the downstream belt conveyor C1 which passes through the microwave irradiation sources 1A.

Microwave absorption regions 12 are provided at both ends of the microwave irradiation part 1 through which the downstream belt conveyor C1 moves in and moves out. The microwave absorption regions 12 are provided for preventing the microwave from leaking from an input I and an output O of the microwave irradiation part 1 to avoid influence upon the human body or other equipment.

The microwave irradiation sources 1A oscillate microwaves, wherein the dough K is baked while it is irradiated with the microwave.

The microwave irradiation part 1 is also provided with hot air blowing ports 1B or other external heating sources such as gas, electricity as an auxiliary heating means. The hot air blowing ports 1B are disposed inside the outer covering body 11 through which hot air is blown out. The microwave irradiation sources 1A and the hot air blowing ports 1B of the microwave irradiation part 1 are respectively paired and are disposed in the moving direction of the downstream belt conveyor C1 at the upper and lower parts of the microwave irradiation part 1 so as to sandwich therebetween the downstream belt conveyor C1. Since the downstream belt conveyor C1 includes a belt, and more specifically a reticular endless belt 14, hot air or microwaves from the lower part of the microwave irradiation part 1, can sufficiently pass through the endless belt 14 without difficulty.

Meanwhile, the upstream belt conveyor C2 is provided at an outer frame body A1 which is extended from the microwave irradiation part 1, and it includes a downstream roller 20, an upstream roller 21 and an endless belt 22 which is extended between or entrained around the downstream roller 20 and upstream roller 21. A tension roller is frequently provided to give tension to the endless belt 22. A stage H is defined between the downstream belt conveyor C1 and upstream belt conveyor C2. That is, the downstream roller 20 of the upstream belt conveyor C2 is positioned over the upstream roller 13 of the downstream belt conveyor C1. The upstream belt conveyor C2 is designed to be adjusted in height so that the stage H or the difference in height between the downstream belt conveyor C1 and upstream belt conveyor C2 can be adjusted. More specifically, when the downstream roller 20 is changed in height by a vertically movable adjusting means in the upstream belt conveyor C2, the stage H between the downstream belt conveyor C1 and upstream belt conveyor C2 can be adjusted.

The vertically movable adjusting means will be now described in detail. A supporting link 23 is attached to a shaft of the downstream roller 20 by way of bearings, not shown. The supporting link 23 has a screw portion 24 at the other end thereof, and the screw portion 24 is screwed into a female screw portion formed in an inner periphery of a cylinder 25. The cylinder 25 is attached to a motor 28 by way of a speed change gear 27. The motor 28, speed change gear 27 and screw portion 24 are respectively provided on a base plate 26 which is pivotally mounted on a fulcrum 29.

The motor 28 can be normally or reversely rotated by a switch 30. Accordingly, the rotation or torque of the motor is transmitted to the cylinder 25 via the speed change gear 27 to move the supporting link 23 vertically, so that the downstream roller 20 is moved vertically and eventually the height of the upstream belt conveyor C2 can be changed.

Accordingly, the stage H between the belt conveyors C1 and C2 can be adjusted by the vertically movable adjusting means by a given distance.

When the dough K is supplied to the upstream belt conveyor C2 in the dough baking apparatus A, the supplied dough K is moved away from the upstream belt conveyor C2 and is delivered onto the downstream belt conveyor C1 while it is dropped.

During this period, the dough K is stretched under non-pressure and non-contact state so that undue internal stress which has been already present therein is reduced and the dough is efficiently stretched in the stretching direction, thereby uniformly forming a long texture of dough having particles oriented in a specific direction.

Since the belt conveyors C1 and C2 are structured so that the speeds thereof can be changed independently, and hence if the ratio therebetween is changed, the size of the texture of dough can be freely adjusted. After the texture of dough is adjusted to a given size, it is transferred to the microwave irradiation part 1 where it is baked and fixed while it is irradiated with the microwave.

An apparatus for carrying out the method of baking dough according to the first embodiment is the same as that illustrated in FIG. 3 except for the position of the upstream belt conveyor C2, and hence the detailed structure thereof is omitted.

That is, when the upstream belt conveyor C2 is attached to the outer frame body A1 at the same level or height as the downstream belt conveyor C1, the dough baking apparatus for carrying out the method of the first embodiment is structured. However, the microwave irradiation sources 1A and hot air blowing ports 1B of the microwave irradiation part 1 may be attached to a middle wall body 11A extended from the outer covering body 11 as shown in FIG. 1 (B).

Described next is a case where the method and apparatus for baking dough described above is applied to a method of producing crumbs.

Figure 4:
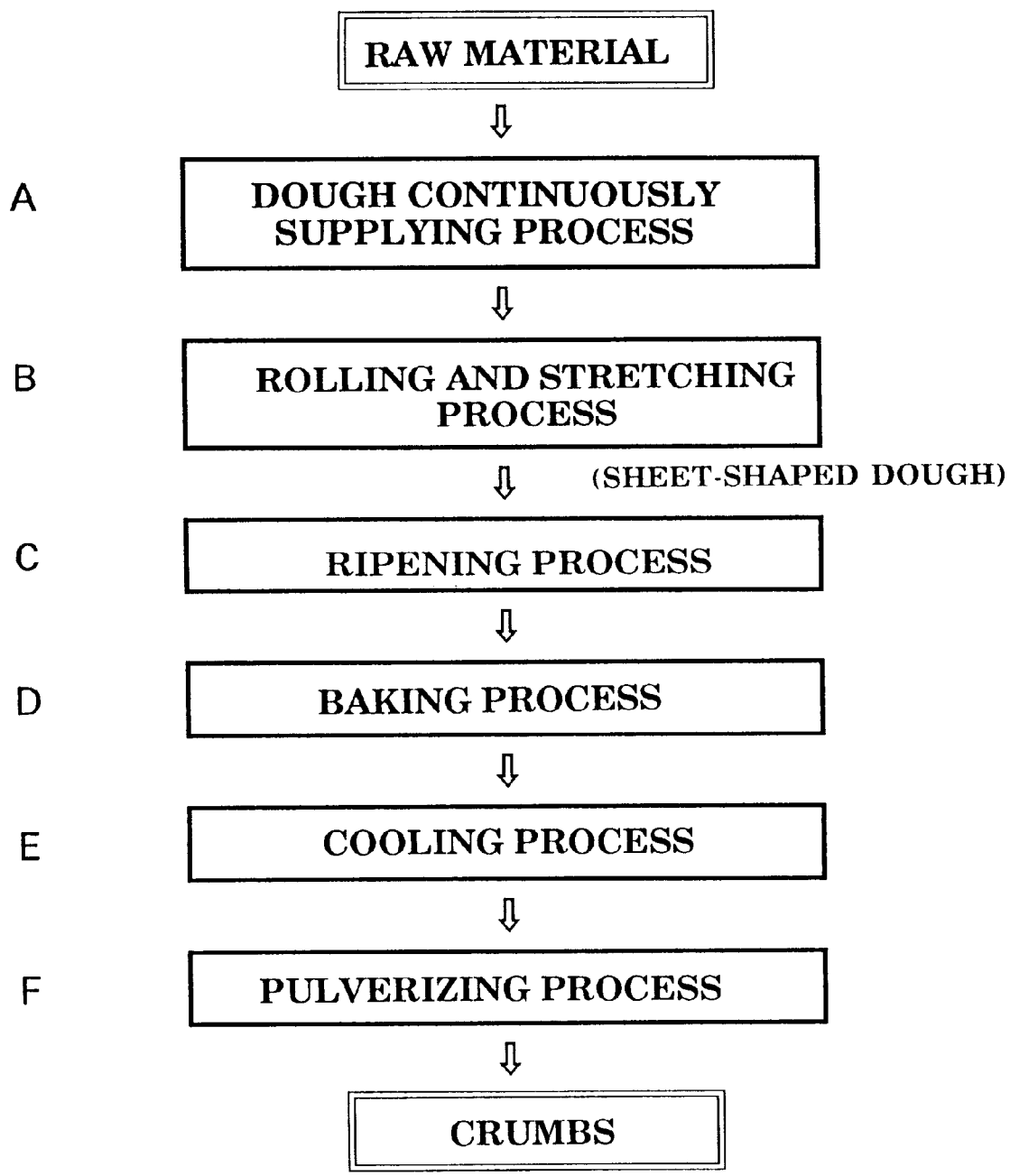
FIG. 4 is a block diagram showing a series of processes for producing crumbs.
Figure 5:
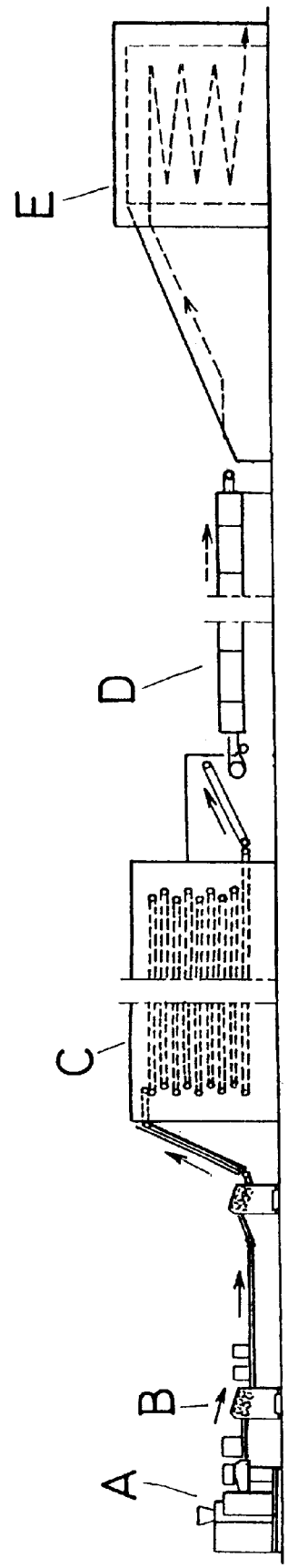
FIG. 5 is a schematic view showing a concrete production line of crumbs wherein mixing and pulverizing processes are separately provided.

FIG. 4 is a block diagram showing a series of processes of the method of producing crumbs. The processes comprise a dough continuously supplying process A, rolling and stretching process B, a ripening process C, baking process D, a cooling process E and a pulverizing process F. FIG. 5 is a schematic view showing a concrete production line of crumbs for carrying out the processes A to E but the pulverizing process F is carried out in a different location.

The processes from the state of dough to the completion of crumbs will be now sequentially explained.

In the process A, dough prepared by mixing flour, yeast, yeast food, salt, grape sugar, oils and fats, and water is introduced into a continuous dough supplying apparatus, through which dough is continuously supplied in a shape of belt having a given thickness.

In the process B, the thus continuously supplied belt-shaped dough is rolled and stretched. The rolling and stretching of the dough is normally performed when it passes through a pair of vertically disposed rollers (front roller and back roller) which are disposed in different positions, namely at the front or rear positions. Pressure is applied from the vertical rollers to the dough so that the dough is rolled, then it is subject to a stretching operation owing to the difference of rotating speeds of the front and back rollers, and is finally stretched. When the rolling and stretching operations are repeated a couple of times, the dough is gradually rolled and stretched. When the dough is subjected to the rolling and stretching operations, the dough is changed to the dough K when it is discharged from the continuous dough supplying apparatus.

In the process C, the dough K is ripened in a drier for a given time. In the drier, the temperature and humidity are held at a given value, for example, at 37 to 40° C. in temperature and 70 to 90% in humidity where the dough is fermented for about 30 to 40 minutes. When the dough is fermented, the texture of dough is clearly formed and the thickness of dough is doubled.

In the process D, the baking of the dough is then performed using the baking apparatus of this invention.

First, the dough which is completed in fermentation is stretched under non-pressure state between the downstream belt conveyor C1 and upstream belt conveyor C2, thereby forming the texture of dough having particles oriented in a specific direction. The texture of dough is adjusted in a given size when the stretching rate is varied. Subsequently the dough which is adjusted in the texture thereof is baked while it is irradiated with the microwave at the microwave irradiation part 1 of the baking apparatus quickly before the texture of dough contracts, and hence the texture of dough is fixed.

In the process D, the dough which is baked and the texture of which is fixedly formed is positively cooled, for example, by the normal cooling or cold air, to the normal temperature.

In the process F, the dough which has been baked and cooled to the room temperature is then pulverized finely by a perverizer, and is finally changed to crumbs. The dough is cut to pieces when it is pulverized to have a size to be inserted into the pulverizer.

The crumbs keep the same shape as the texture of dough which is fixed in the baking process. In the method of producing crumbs, the dough is changed to the crumbs having a given texture using the method and apparatus for producing crumbs of the present invention.

When the method and apparatus for baking dough is used for producing crumbs, the effect can be very easily determined since it has a direct influence upon the shape of the crumbs, but the method and apparatus for baking dough of this invention can be also applied to the production or baking of bread per se and therefore is not limited to the production of crumbs. In the case of baking bread, the texture of dough which is present when baked in the shape of bread can be freely adjusted, thereby freely changing the characteristics of the bread, particularly resistance to the teeth.

The present invention is not limited to the aforementioned embodiments, but it can be modified variously without departing from the scope of this invention. For example, it should be understood that not only the downstream roller 20 alone is vertically moved in the upstream belt conveyor C2, but also the upstream belt conveyor C2 can be vertically moved as a whole in parallel with the downstream belt conveyor C1.

Further, the upstream belt conveyor may be positioned lower than the downstream belt conveyor of the microwave irradiation part. Still further, the hot air blowing ports 1B in the microwave irradiation part may be replaced with other external heating means or may be omitted, if not necessary.

According to the method and apparatus for baking dough, the texture of dough can be easily adjusted in size even if the mixture of the ingredients is not changed. Accordingly, if the apparatus for baking dough is incorporated into a crumb production line or bread production line, crumbs or bread having different texture can be freely produced. Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A method of baking dough comprising adjusting the texture of dough by a pair of upstream and downstream belt conveyors which are moved at different speeds, wherein the dough is placed on the pair of belt conveyors and stretched without subjecting the dough to external pressure immediately before the dough is baked by irradiation with a microwave.

2. The method according to claim 1, wherein the dough is irradiated with microwaves which range from 300 to 3000 MHz in frequency.

3. A method of baking dough comprising adjusting the texture of dough by a pair of belt conveyors which are arranged at different heights and moved at different speeds, wherein the dough is placed on the pair of belt conveyors and stretched without subjecting the dough to external pressure immediately before the dough is baked by irradiation with a microwave.

4. The method according to claim 3, wherein the dough is irradiated with microwaves which range from 300 to 3000 MHz in frequency.

5. A method of baking dough comprising steps of adjusting the texture of dough by a pair of upstream and downstream belt conveyors which are moved at different speeds, wherein the downstream belt conveyor is positioned under the upstream belt conveyor and the dough is placed on the pair of belt conveyors and stretched without subjecting the dough to external pressure, and fixing the adjusted texture of the dough by subjecting the dough to irradiation with microwaves ranging from 300 to 3000 MHz in frequency.

6. A method of baking dough comprising the steps of:

(1) providing an upstream conveyor moving at a first speed and a downstream conveyor adjacent the upstream conveyor and moving at a second speed greater than the first speed;

(2) placing dough on the upstream conveyor and transporting the dough at the first speed;

(3) adjusting the texture of the dough by transferring the dough from the upstream conveyor to the downstream conveyor to transport the dough at the second speed and thus stretch the dough without application of a pressing force thereto as the dough is transferred between the conveyors; and (4) immediately thereafter fixing the texture of the dough as adjusted in said step (3) by irradiating the dough with microwaves to prevent the dough from relaxing.

7. The method of claim 6 further including arranging the upstream conveyor above the downstream conveyor.

8. The method of claim 7 further including adjusting the height of the upstream conveyor relative to the height of the downstream conveyor.

9. The method of claim 6 wherein said step (4) includes irradiating the dough with microwaves which range from about 300 MHz to about 3000 MHz.

* * * * *